(12) United States Patent
Chou

(10) Patent No.: US 11,689,380 B2
(45) Date of Patent: Jun. 27, 2023

(54) METHOD AND DEVICE FOR VIEWING CONFERENCE

(71) Applicant: ASPEED Technology Inc., Hsinchu (TW)

(72) Inventor: Chen-Wei Chou, Hsinchu (TW)

(73) Assignee: ASPEED Technology Inc., Hsinchu (TW)

( * ) Notice: Subject to any disclaimer, the term of this patent is extended or adjusted under 35 U.S.C. 154(b) by 0 days.

(21) Appl. No.: 17/534,378

(22) Filed: Nov. 23, 2021

(65) Prior Publication Data

US 2023/0006851 A1  Jan. 5, 2023

(30) Foreign Application Priority Data

Jul. 2, 2021 (TW) .................................. 110124469

(51) Int. Cl.
*H04L 12/18* (2006.01)
*G06F 16/783* (2019.01)
*G06F 16/78* (2019.01)
*H04N 7/15* (2006.01)

(52) U.S. Cl.
CPC ...... *H04L 12/1831* (2013.01); *G06F 16/7834* (2019.01); *G06F 16/7867* (2019.01); *H04N 7/15* (2013.01)

(58) Field of Classification Search
CPC ............. G06F 16/7834; G06F 16/7867; G06F 16/739; H04L 12/1831; H04N 7/15; H04N 7/155
See application file for complete search history.

(56) References Cited

U.S. PATENT DOCUMENTS

| 6,567,775 | B1 * | 5/2003 | Maali | G06V 20/40 704/231 |
| 7,298,930 | B1 * | 11/2007 | Erol | G11B 27/28 707/999.001 |
| 7,343,289 | B2 * | 3/2008 | Cutler | G10L 15/25 704/259 |
| 7,598,975 | B2 * | 10/2009 | Cutler | H04N 23/90 348/14.06 |
| 2005/0285943 | A1 * | 12/2005 | Cutler | G06V 40/173 348/E9.051 |
| 2011/0078591 | A1 * | 3/2011 | van Os | H04N 21/4438 715/756 |
| 2022/0337443 | A1 * | 10/2022 | Sood | G06F 16/735 |

FOREIGN PATENT DOCUMENTS

| CN | 103297688 | 9/2013 |
| CN | 105744208 | 7/2016 |
| TW | 202042549 | 11/2020 |

OTHER PUBLICATIONS

"Office Action of Taiwan Counterpart Application", dated Feb. 25, 2022, p. 1-p. 10.

* cited by examiner

*Primary Examiner* — Thomas J Dailey
(74) *Attorney, Agent, or Firm* — JCIPRNET

(57) ABSTRACT

A method and a device for viewing a conference are provided. In the method, after a wide-view video of a specific conference, related conference event data, and speech content of each participant are obtained, a highlight video of the specific conference is correspondingly generated. Accordingly, the efficiency of conference viewing is improved.

18 Claims, 9 Drawing Sheets

METHOD AND DEVICE FOR VIEWING CONFERENCE

CROSS-REFERENCE TO RELATED APPLICATION

This application claims the priority benefit of Taiwanese application no. 110124469, filed on Jul. 2, 2021. The entirety of the above-mentioned patent application is hereby incorporated by reference herein and made a part of this specification.

BACKGROUND

Technical Field

The disclosure relates to an information recording technique, and particularly relates to a method and a device for viewing a conference.

Description of Related Art

In the related art, most commonly used video conference recording software directly records a video of an entire video conference to generate a conference record. However, in addition to causing the recorded content to be too lengthy, such recording method is also difficult to find a key part of the conference afterwards. In addition, the above method is usually not necessarily able to record the part of the conference that a viewer wants to see, and such problem is more severe when a viewing angle of an adopted camera is greater than 180 degrees.

SUMMARY

The disclosure is directed to a method and a device for viewing a conference, which are adapted to resolve the aforementioned technical problem.

The disclosure provides a method for viewing a conference, and the method includes the following steps. A wide-view video of a specific conference and a plurality of conference event data associated with the wide-view video are obtained. Each conference event data corresponds to a time point of the specific conference, and each conference event data records a sound source direction of a speaker at the corresponding time point and an image range of the speaker in the wide-view video. Individual speech content of a plurality of participants of the specific conference is obtained. A plurality of specific time sections are obtained in the wide-view video, and at least one discussant is found out in each of the specific time sections according to the plurality of conference event data corresponding to each of the specific time sections. Speech content of each discussant is obtained in each of the specific time sections. A discussion image and the speech content of each discussant in each of the specific time sections are arranged into a corresponding discussion video clip. The discussion video clip corresponding to each of the specific time sections is organized into a conference recording video corresponding to the specific conference.

The disclosure provides a conference viewing device including a storage circuit and a processor. The storage circuit stores a program code. The processor is coupled to the storage circuit and accesses the program code for the following operations. The processor obtains a wide-view video of a specific conference and a plurality of conference event data associated with the wide-view video. Each conference event data corresponds to a time point of the specific conference, and each conference event data records a sound source direction of a speaker at the corresponding time point and an image range of the speaker in the wide-view video. The processor obtains individual speech content of a plurality of participants of the specific conference. The processor determines a plurality of specific time sections in the wide-view video and finds out at least one discussant in each of the specific time sections according to the plurality of conference event data corresponding to each of the specific time sections. The processor obtains speech content of each discussant in each of the specific time sections. The processor arranges a discussion image and the speech content of each discussant in each of the specific time sections into a corresponding discussion video clip. The processor organizes the discussion video clip corresponding to each of the specific time sections into a conference recording video corresponding to the specific conference.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Generally, most commonly used conference recording systems include following technologies: (1) beamforming: estimating a location of a sound source through a microphone array; (2) object tracking: tracking a specific object in a conference image; (3) people finding: finding out a location of a specific person in a conference image; (4) speaker view: automatically pointing a camera at the sound source for shooting; (5) participant mode: automatically cutting a large image of the entire conference to an image only including the participants; (6) saving conference records:

directly recording the entire video conference; (7) voice to text; (8) language processing: including translation, abstract, etc.

Figure 1A:
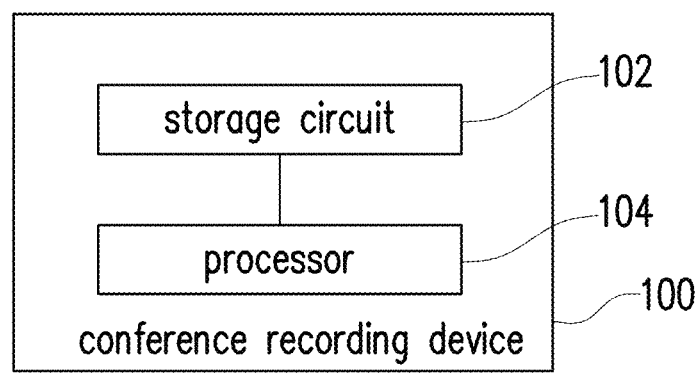
FIG. 1A is a schematic diagram of a conference recording device according to an embodiment of the disclosure.

Referring to FIG. 1A, FIG. 1A is a schematic diagram of a conference recording device according to an embodiment of the disclosure. In different embodiments, a conference recording device 100 may be implemented by various smart devices and/or computer devices.

As shown in FIG. 1A, the conference recording device 100 may include a storage circuit 102 and a processor 104. The storage circuit 102 is, for example, any type of a fixed or removable random access memory (RAM), a read-only memory (ROM), a flash memory, a hard disk or other similar devices or a combination of these devices that may be used to record a plurality of program codes or modules.

The processor 104 is coupled to the storage circuit 102, and may be a general purpose processor, a special purpose processor, a conventional processor, a digital signal processor, a plurality of microprocessors, one or a plurality of microprocessors, controllers, microcontrollers, application specific integrated circuits (ASIC), field programmable gate arrays (FPGA), any other types of integrated circuits, state machines, processors based on advanced RISC machine (ARM) and similar products combined with digital signal processor kernels.

In the embodiment of the disclosure, the processor 104 may access the modules and program codes recorded in the storage circuit 102 to implement a method for viewing a conference proposed by the disclosure, and details thereof are described below.

Figure 1B:
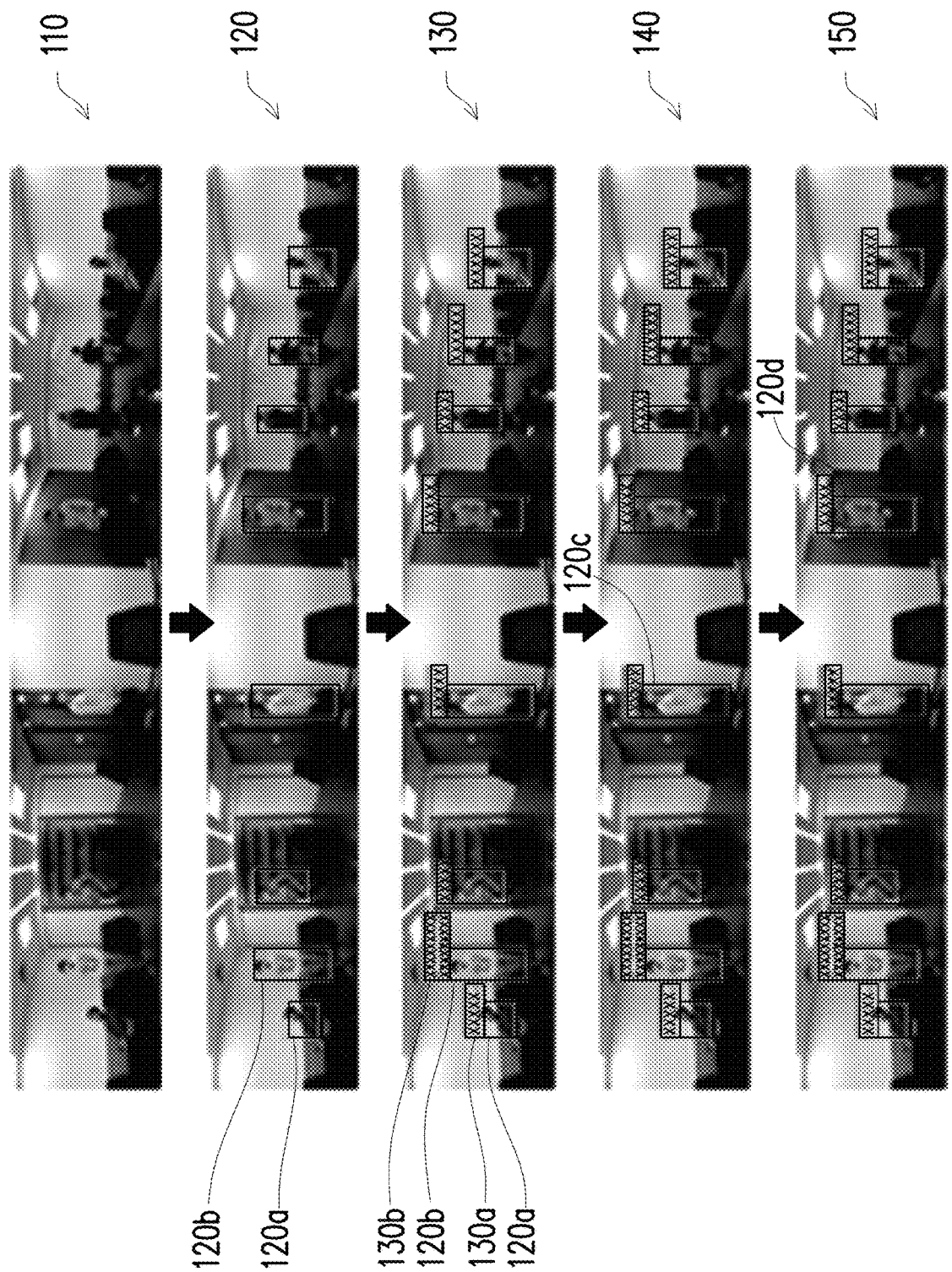
FIG. 1B is a schematic diagram of wide-view conference images according to an embodiment of the disclosure.

In an embodiment, in order to make the concept of the disclosure easier to understand, FIG. 1B is provided below for further explanation, and FIG. 1B is a schematic diagram of wide-view conference images according to an embodiment of the disclosure.

In FIG. 1B, a conference image 110 is, for example, a wide-view conference image taken by a wide-view camera (with a viewing angle greater than or equal to 180 degrees) set in a conference room, but the disclosure is not limited thereto.

In an embodiment, after the conference image 110 is obtained, a user of the conference recording device 100 may frame persons of interest and/or objects of interest (for example, a whiteboard) with corresponding rectangular boxes. In addition, the processor 104 may also automatically perform person detection on the conference image 110 to frame detected persons in the conference image 110 with the corresponding rectangular boxes to generate content as shown in a conference image 120. After the above operation, the conference image 110 may be correspondingly changed to the conference image 120 including a plurality of rectangular boxes (for example, rectangular boxes 120a, 120b).

In some embodiments, the user may edit a corresponding tag (such as a name of the person/object, etc.) on each rectangular box in the conference image 120. For example, it is assumed that the rectangular boxes 120a and 120b respectively correspond to a plurality of participants of the conference, the user may write a name of the corresponding participant into the tag of each of the rectangular boxes 120a and 120b, but the disclosure is not limited thereto. In addition, the processor 104 may also display the tags of one or more rectangular boxes in the conference image 120 with some predetermined names. For example, corresponding to the rectangular boxes of some participants, the processor 104 may edit the tags thereof with predetermined names such as "person 1", "person 2", etc. Similarly, corresponding to the rectangular boxes of some objects, the processor 104 may edit the tags thereof with predetermined names such as "object 1", "object 2", etc., but the disclosure is not limited thereto.

After the above operations, the conference image 120 may be correspondingly changed to a conference image 130, where each rectangular box may have a corresponding tag, for example, a tag 130a corresponding to the rectangular box 120a, and a tag 130b corresponding to the rectangular box 120b, but the disclosure is not limited thereto.

In some embodiments, the user may select one or a plurality of rectangular boxes to be tracked in the conference image 130 (for example, a rectangular box corresponding to a speaker), and the conference image 130 may be correspondingly changed to the content shown in a conference image 140. In this case, the processor 104 may continuously track the person/object located in the selected one or a plurality of rectangular boxes (for example, a rectangular box 120c), and accordingly let the rectangular box to move along with movement the person/object.

In an embodiment, the processor 104 may also detect a sound source direction of a sound in the conference, and find out the corresponding rectangular box in the conference image 140 based on the sound source direction. In this way, the processor 104 may learn which person corresponding to the rectangular box makes the sound. In an embodiment, the processor 104 may mark the rectangular box corresponding to the sound source direction in a specific manner (for example, to change it to a specific color) to highlight which person in the rectangular box is making the sound at the moment, as shown by a rectangular box 120d in a conference image 150. In an embodiment, the processor 104 may also perform voice recognition on the aforementioned sound to obtain speech content (for example, a transcript) of the person in the rectangular box 120d.

In some embodiments, the processor 104 may determine the sound source direction of the aforementioned sound and the corresponding rectangular box thereof based on techniques such as beamforming, direction of arrival (DOA), sound localization, lip detection (lip detection), face recognition, etc., but the disclosure is not limited thereto.

Based on the aforementioned concept, the processor 104 may record an image range (i.e., the corresponding rectangular box), related speech content, and a related time point of each participant in each conference image in the entire conference, but the disclosure is not limited thereto.

Figure 2:
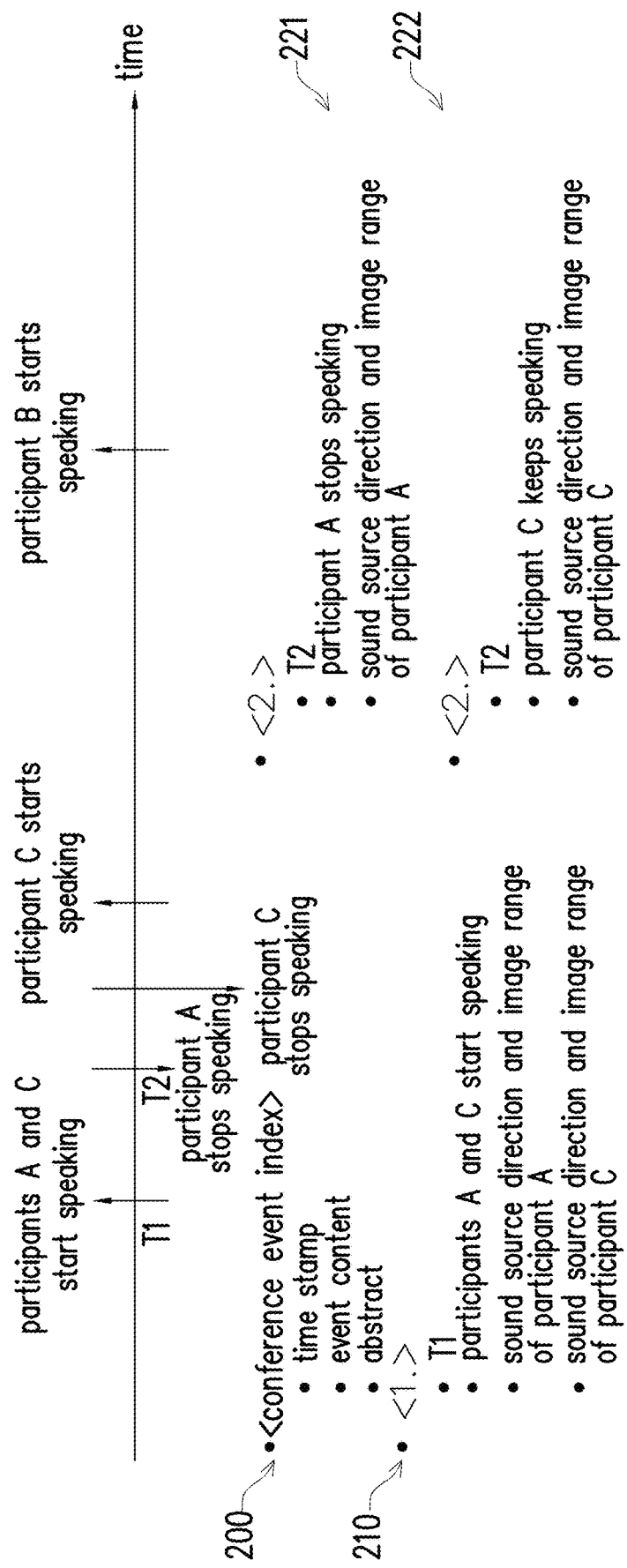
FIG. 2 is a schematic diagram of conference event data according to an embodiment of the disclosure.

Referring to FIG. 2, FIG. 2 is a schematic diagram of conference event data according to an embodiment of the disclosure. In the embodiment, the processor 104 may record each conference event that occurs in the conference with corresponding conference event data, where each conference event corresponds to, for example, a time point when a speaking state of one or more participants in the conference changes (such as changing from never speaking to speaking, or changing from speaking to stopping speaking), but the disclosure is not limited thereto.

In the embodiment, the conference event data related to each conference event may be, for example, recorded by adopting a format 200. For example, it is assumed that a $1^{st}$ conference event in the conference is occurred at a time point T1, the processor 104 may record related information into conference event data 210 based on the format 200. In an embodiment, the conference event data 210 may record, for example, an index value of the $1^{st}$ conference event (i.e., "1"), the time point T1, the event content (i.e., "participants A and C start speaking"), a sound source direction and an image range of the participant A (i.e., a rectangular box range currently corresponding to the participant A), a sound source direction and an image range of the participant C (i.e., a rectangular box range currently corresponding to the participant C), but the disclosure is not limited thereto. In addition, while generating conference event data 221, the processor 104 may further record the related speech content of the participants A and C based on the previous teaching.

Moreover, it is assumed that a $2^{nd}$ conference event in the conference is occurred at a time point T2, the processor 104 may record related information into the conference event data 221 based on the format 200. In an embodiment, the conference event data 221 may record, for example, an index value of the $2^{nd}$ conference event (i.e., "2"), the time point T2, the event content (i.e., "the participant A stops speaking"), a sound source direction and an image range of the participant A.

In other embodiments, since the $2^{nd}$ conference event may also be construed as "the participant C keeps speaking", the processor 104 may also record information related to the $2^{nd}$ conference event as conference event data 222 based on the format 200. In an embodiment, the conference event data 222 may record, for example, an index value of the $2^{nd}$ conference event (i.e., "2"), the time point T2, the event content (i.e., "the participant C keeps speaking"), a sound source direction and an image range of the participant C. In other words, the conference event data 221 and 222 are different recording methods for the same conference event, but the disclosure is not limited thereto. Moreover, while generating the conference event data 221 and 222, the processor 104 may further record the related speech content of the participant C based on the previous teaching.

For other conference events (for example, "the participant C stops speaking", "the participant C starts speaking", etc.) the processor 104 may also record related information as corresponding conference event data based on the previous teaching, and details thereof are not repeated.

In some embodiments, it is assumed that a certain conference is synchronized participated by participants located in different conference places, the processor 104 may still generate related conference event data based on the above teachings. For example, it is assumed that wide-view cameras C and D are respectively set in conference rooms A and B, and people in the conference rooms A and B participate in a same online conference. In this case, the processor 104 may execute the mechanism taught in the previous embodiment when receiving the conference images taken by the wide-view cameras C and D for this online conference, and generate conference event data related to the above online conference by synthesizing the conference images of the wide-view cameras C and D, but the disclosure is not limited thereto.

In some embodiments, the disclosure further provides a method for viewing a conference, which is adapted to present a relatively lengthy wide-view video in a relatively simplified conference recording video (which may be construed as a highlight video of the aforementioned specific conference) after obtaining a wide-view video of a specific conference (which includes a plurality of conference images of the specific conference) and related conference event data. In this way, users may understand the general content of the above specific conference only based on this conference recording video. The related details are described below.

Figure 3:
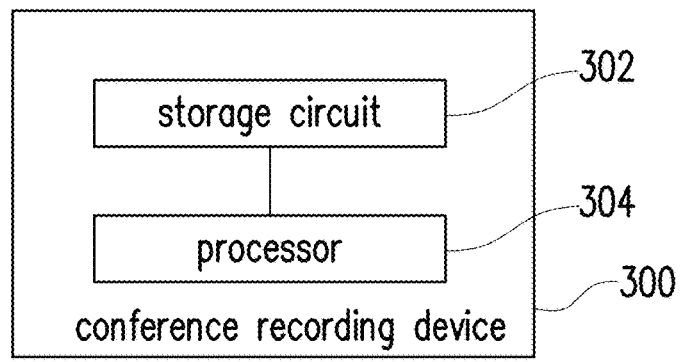
FIG. 3 is a schematic diagram of a conference viewing device according to an embodiment of the disclosure.

Referring to FIG. 3, FIG. 3 is a schematic diagram of a conference viewing device according to an embodiment of the disclosure. In different embodiments, a conference viewing device may be implemented as various smart devices and/or computer devices.

As shown in FIG. 3, the conference viewing device 300 may include a storage circuit 302 and a processor 304, where the storage circuit 302 and the processor 304 may be individually implemented with reference to the storage circuit 102 and the processor 104, and details thereof are not repeated.

In some embodiments, the conference recording device 100 and the conference viewing device 300 may be implemented as a same device or implemented as different devices.

In an embodiment of the disclosure, the processor 304 may access modules and program codes recorded in the storage circuit 302 to implement a method for viewing a conference proposed by the disclosure, and the details thereof are described as follows.

Figure 4:
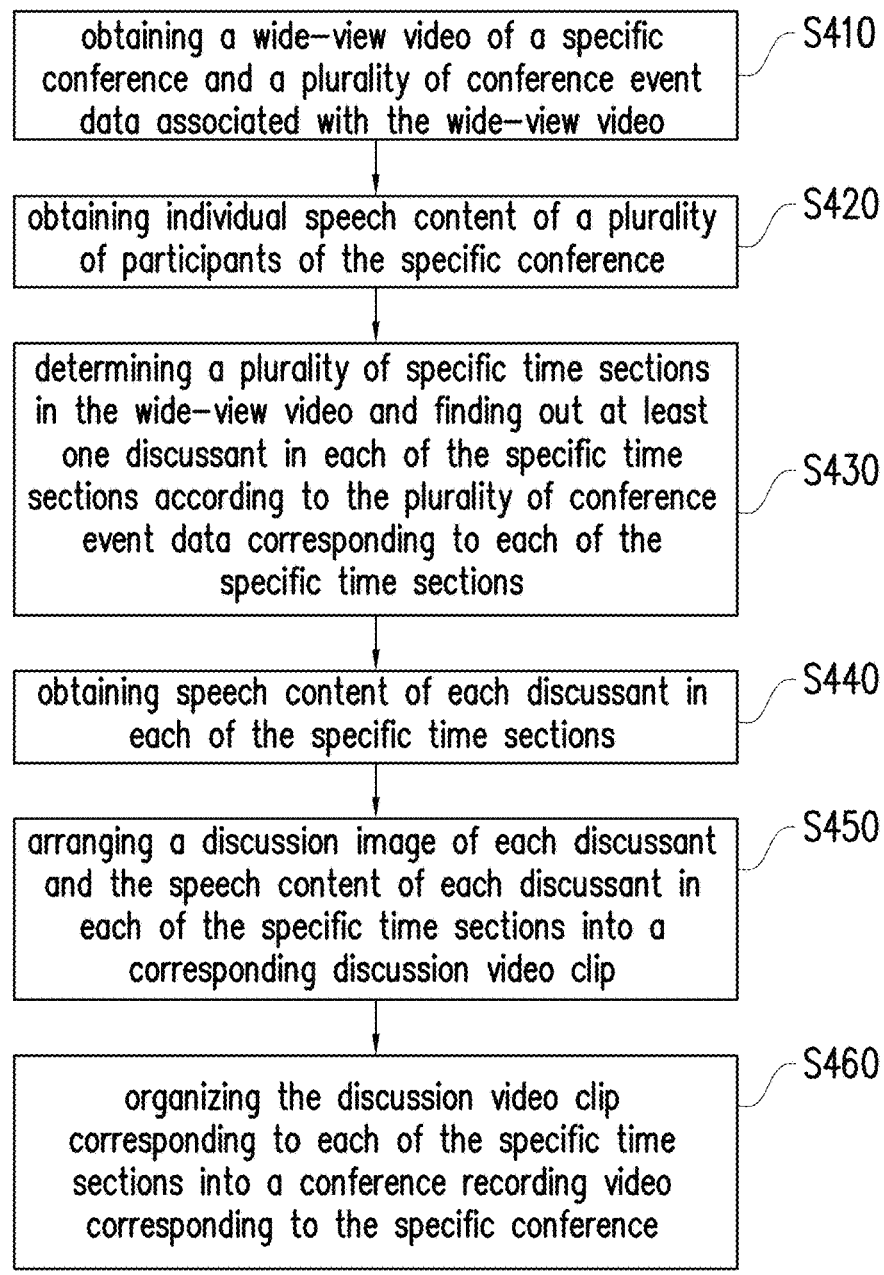
FIG. 4 is a flow chart of a method for viewing a conference according to an embodiment of the disclosure.

Referring to FIG. 4, FIG. 4 is a flow chart of a method for viewing a conference according to an embodiment of the disclosure. In the embodiment, the method in FIG. 4 may be executed by the conference viewing device 300 of FIG. 3, and details of each step of FIG. 4 are described below with reference to the components shown in FIG. 3.

First, in step S410, the processor 304 may obtain a wide-view video of a specific conference and a plurality of conference event data associated with the wide-view video. In one embodiment, it is assumed that the conference recording device 100 is used to record the wide-view video of the aforementioned specific conference and generate related conference event data, the processor 304 may, for example, receive the wide-view video of the aforementioned specific conference and the related conference event data produced by the processor 104 from the conference recording device 100, but the disclosure is not limited thereto.

Thereafter, in step S420, the processor 304 obtains individual speech content of a plurality of participants of the specific conference. In an embodiment, the processor 304 may also receive the speech content recorded by the processor 104 for each participant of the above specific conference from the conference recording device 100, but the disclosure is not limited thereto.

In step S430, the processor 304 determines a plurality of specific time sections in the wide-view video, and finds out a discussant in each specific time section according to the plurality of conference event data corresponding to each specific time section.

In different embodiments, the processor 304 may determine the aforementioned specific time sections in the wide-view video based on different methods, which will be further described below.

Figure 5A:
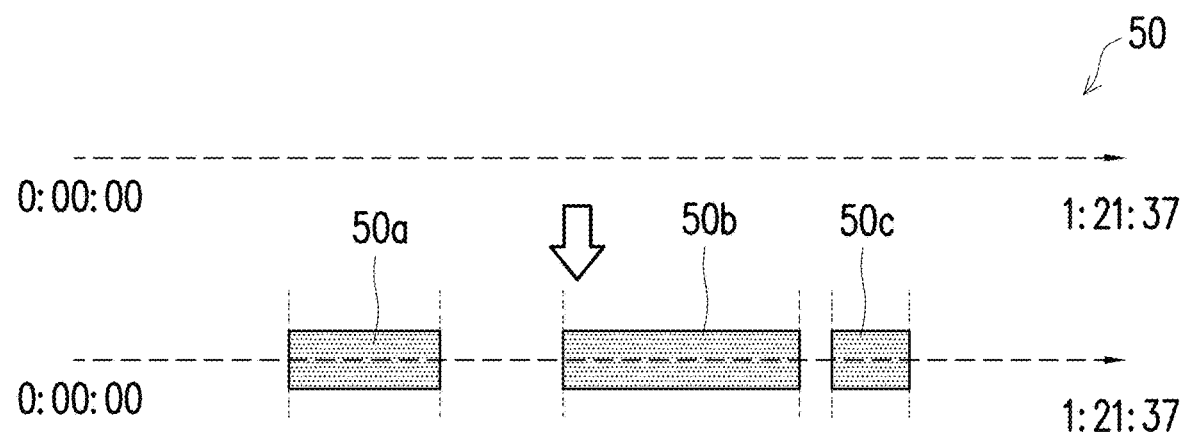
FIG. 5A is a schematic diagram of determining specific time sections according to a first embodiment of the disclosure.

Referring to FIG. 5A, FIG. 5A is a schematic diagram of determining the specific time sections according to a first embodiment of the disclosure. In the embodiment, the processor 304 may, for example, provide a conference timeline 50 of the wide-view video, and the user may mark one or a plurality of required time sections on the conference timeline 50 by himself. It is assumed that the user marks a plurality of designated time sections 50a-50c on the conference timeline 50, the processor 304 may take the designated time sections 50a-50c as the plurality of specific time sections in step S430.

Figure 5B:
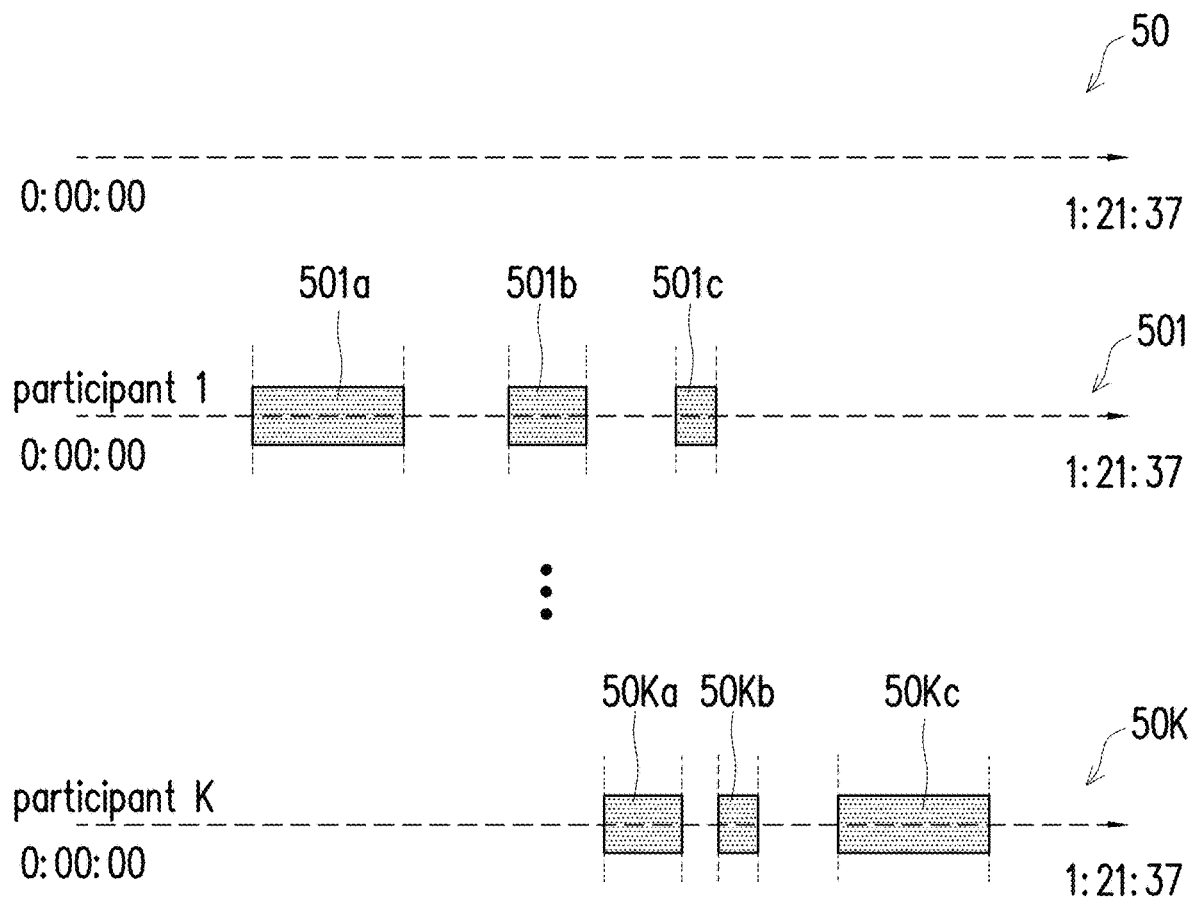
FIG. 5B is a schematic diagram of determining specific time sections according to a second embodiment of the disclosure.

Referring to FIG. 5B, FIG. 5B is a schematic diagram of determining the specific time sections according to a second embodiment of the disclosure. In the embodiment, the processor 304 may, for example, provide the conference timeline 50 of the wide-view video for the user's reference. In addition, the processor 304 may also provide a discussion-participating timeline of each participant of the aforementioned specific conference in the specific conference, where the discussion-participating timeline of each participant may be marked with discussion-participating sections of each participant in the specific conference.

For example, it is assumed that the aforementioned specific conference includes a participant 1 to a participant K (where K is a positive integer), the processor 304 may provide individual discussion-participating timelines 501-50K of the participant 1 to the participant K based on the related conference recording data of the aforementioned specific conference. In the discussion-participating timeline 501 of the participant 1, the processor 304 may mark discussion-participating sections 501*a*-501*c* of the participant 1 in the specific conference, where each of the discussion-participating sections 501*a*-501*c* is, for example, a time section in which the participant 1 has participated in a discussion (for example, make a speech), but the disclosure is not limited thereto. Similarly, in the discussion-participating timeline 50K of the participant K, the processor 304 may mark discussion-participating sections 50K*a*-50K*c* of the participant K in the specific conference, where each of the discussion-participating sections 50K*a*-50K*c* is, for example, a time section in which the participant K has participated in a discussion (for example, make a speech), but the disclosure is not limited thereto.

Based on the discussion-participating timelines 501-50K, the user may learn which participant has participated in the discussion during which time section, and then decide one or a plurality of time sections to be marked on the conference timeline 50. It is assumed that the user marks the designated time sections 50*a*-50*c* in FIG. 5A on the conference timeline 50, the processor 304 may take the designated time sections 50*a*-50*c* as the plurality of specific time sections in step S430, but the disclosure is not limited thereto.

Figure 6:
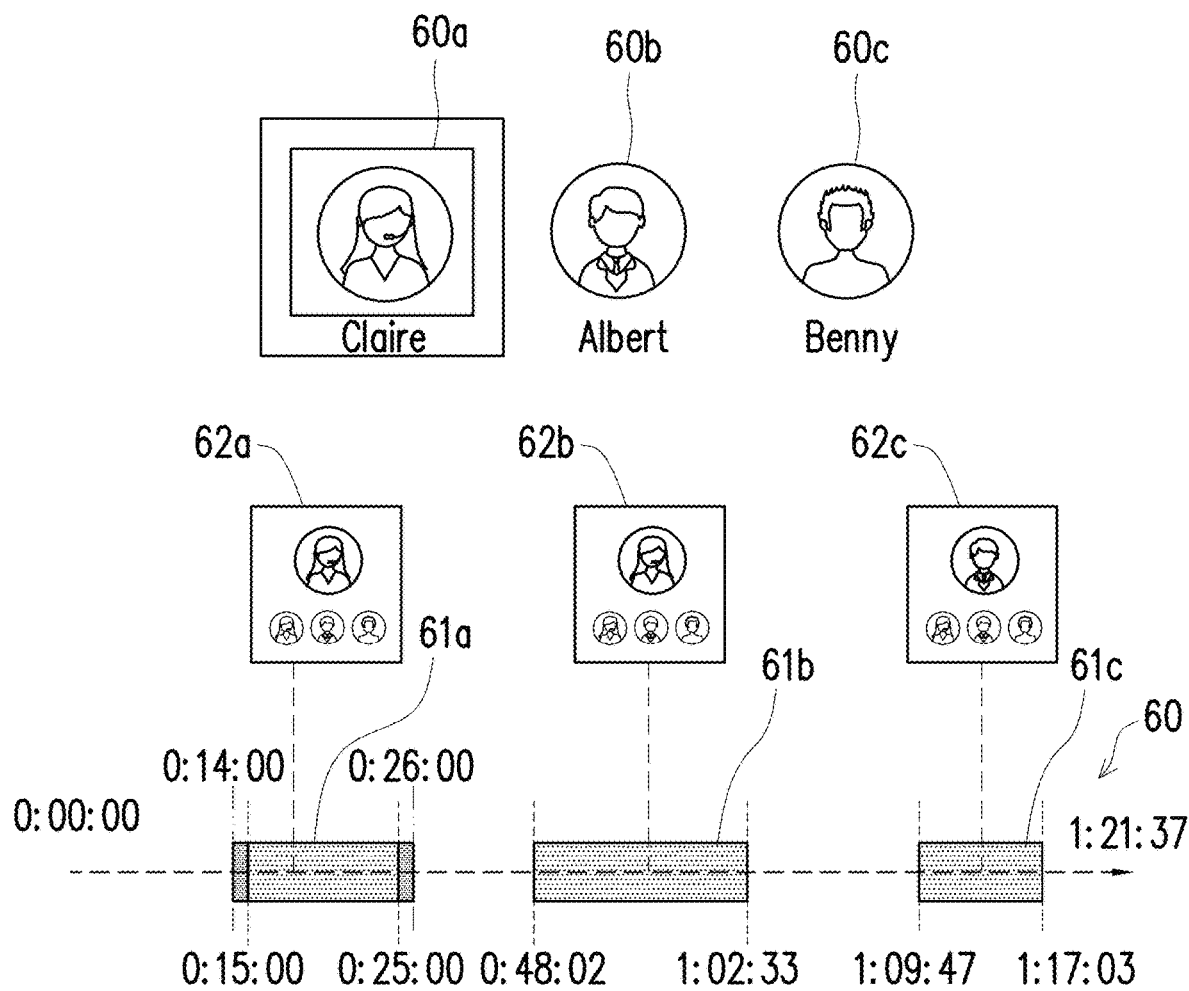
FIG. 6 is a schematic diagram of determining specific time sections according to a third embodiment of the disclosure.

Referring to FIG. 6, FIG. 6 is a schematic diagram of determining the specific time sections according to a third embodiment of the disclosure. In the embodiment, the processor 304 may provide participants of the aforementioned specific conference for selection. In FIG. 6, the processor 304 may display icons 60*a*-60*c* corresponding to the aforementioned participants, and the user may select one or a plurality of participants to be followed.

For example, it is assumed that when the user wants to find out the discussion-participating sections in which the participants Claire and Benny are respectively presenters, the user may select the icons 60*a* and 60*c* accordingly. In this case, the processor 304 may mark discussion-participating sections 61*a*-61*c* of Claire and Benny in the aforementioned specific conference on the conference timeline 60 of the wide-view video.

In FIG. 6, based on the aforementioned conference event data, the processor 304 may also provide corresponding discussant lists 62*a*-62*c* for each of the discussion-participating sections 61*a*-61*c*, and the user may learn about the discussants participating in the discussions in each of the discussion-participating sections 61*a*-61*c*. In addition, the processor 304 may also emphasize a current presenter in a specific manner in the discussant lists 62*a*-62*c*, so that the user may learn the presenters in each of the discussion-participating sections 61*a*-61*c*.

For example, it is assumed that Claire is the presenter in the discussion-participating sections 61*a* and 61*b*, the processor 304 may display the icon of Claire in a larger size in the discussant lists 62*a* and 62*b* accordingly. For another example, it is assumed that Benny is the presenter in the discussion-participating section 61*c*, the processor 304 may correspondingly display the icon of Benny in the larger size in the discussant list 62*c*. In this way, the user may learn that Claire is the presenter in the discussion-participating sections 61*a* and 61*b*, and Benny is the presenter in the discussion-participating section 61*c*, but the disclosure is not limited thereto.

In addition, after providing the discussion-participating sections 61*a*-61*c*, the user may adjust a size of each of the discussion-participating section 61*a*-61*c* according to an actual need. For example, it is assumed that an original start time and an end time of the discussion-participating section 61*a* are 0:15:00 to 0:25:00 as shown in FIG. 6, the user may respectively adjust the above start time and end time to required values, such as 0:14:00 and 0:26:00 shown in FIG. 6, but the disclosure is not limited thereto. Thereafter, the processor 304 may use the (adjusted) discussion-participating sections 61*a*-61*c* as the multiple specific time sections in step S430, but the disclosure is not limited thereto.

In the above situation, although it is assumed that the user wants to follow the discussion-participating sections in which some participants are the presenters, in other embodiments, the user may also determine the characteristics of the participants to be followed based on other principles. For example, in some embodiments, it is assumed that when the user wants to find out the discussion-participating sections in which the participants Claire and Benny are respectively the discussants, the user may correspondingly select the icons 60*a* and 60*c* after triggering the processor 304 to provide a related search function/interface. In this case, the processor 304 may also mark the discussion-participating sections 61*a*-61*c* in which Claire and Benny are discussants in the aforementioned specific conference on the conference timeline 60 of the wide-view video, but the disclosure is not limited thereto.

In other embodiments, the processor 304 may also determine the aforementioned specific time sections in the wide-view video based on other principles. For example, in a fourth embodiment, the processor 304 may first provide the conference timeline 50 of the wide-view video as shown in FIG. 5A. Thereafter, the processor 304 may obtain a designated number of persons set by the user.

In an embodiment, the processor 304 may mark a plurality of first reference time sections on the conference timeline 50 according to the aforementioned designated number of persons. In an embodiment, a number of participants corresponding to each first reference time section may not be less than the aforementioned designated number of persons. To be specific, since some participants may leave or join the conference for some reasons in the middle of the conference, after the user sets the designated number of persons, the processor 304 may find out the time sections in which the number of participants in the aforementioned specific conference is not less than the designated number of persons to serve as the aforementioned first reference time sections. In this way, certain time sections in which the number of participants is too less (for example, a break time) may be excluded.

In another embodiment, the number of discussants corresponding to each first reference time section may not be less than the aforementioned designated number of persons. Specifically, since there may be some parts of the conference that more people actively participate in the discussion, and there may also be some parts of the conference that only a few people participate in the discussion, in this case, after the user set the designated number of persons, the processor 304 may find out the time sections in which more people participate in the discussion during the specific conference to serve as the first reference time sections. In this way, more enthusiastic discussion sections may be found.

After the first reference time sections are provided for the user's reference, the user may select one or more designated time sections (for example, the designated time sections 50a-50c in FIG. 5A). Thereafter, the processor 304 may accordingly use the aforementioned designated time sections as the multiple specific time sections in step S430.

In a fifth embodiment, in the process of determining the aforementioned specific time sections in the wide-view video, the processor 304 may first provide the conference timeline 50 of the wide-view video as shown in FIG. 5A. Thereafter, the processor 304 may provide a keyword search box for the user to input keywords of interest.

In an embodiment, after obtaining a search keyword entered by the user in the keyword search box, the processor 304 may accordingly mark a plurality of second reference time sections on the conference timeline 50, where speech content of the participants of the specific conference in each second reference time section may include the aforementioned search keyword. In brief, after obtaining the search keyword, the processor 304 may find out the time sections in which the search keyword was mentioned by the participants, and extract these time sections to serve as the aforementioned second reference time sections.

After the second reference time sections are provided for the user's reference, the user may select one or more designated time sections (for example, the designated time sections 50a-50c in FIG. 5A). Thereafter, the processor 304 may accordingly use the aforementioned designated time sections as the multiple specific time sections in step S430, but the disclosure is not limited thereto.

After determining the aforementioned specific time sections in the wide-view video according to the above teaching, the processor 304 may find out the discussants in each specific time section according to the plurality of conference event data corresponding to each specific time section.

Taking FIG. 2 as an example, it is assumed that a specific time section D1 covers the time points T1 and T2 in FIG. 2, the processor 304 may learn that the discussants in the specific time section D1 include the participants A and C based on the conference event data 210, 221 (or 222) corresponding to the time points T1 and T2, but the disclosure is not limited thereto.

In other embodiments, in addition to determining the plurality of specific time sections based on one or more designated time sections selected by the user, the processor 304 may also automatically determine the plurality of specific time sections according to an appropriate mechanism.

For example, in the fourth embodiment, after the processor 304 marks the plurality of first reference time sections on the conference timeline 50 according to the aforementioned designated number of persons, the processor 304 may directly use these first reference time sections as the plurality of specific time sections in step S430, but the disclosure is not limited thereto.

In an embodiment, the processor 304 may, for example, identify a specific participant of a specific conference from the participants (for example, a presenter of the entire specific conference or other participants that the user pays attention to), and provide a discussion-participating timeline of the specific participant in the above specific conference. In an embodiment, the discussion-participating timeline of the specific participant may be marked with one or more discussion-participating sections of the specific participant in the above specific conference. Thereafter, the processor 304 may find out a plurality of designated time sections from the aforementioned discussion-participating sections of the specific participant, and take these designated time sections as the plurality of specific time sections in step S430. In an embodiment, a time difference between the designated time sections found by the processor 304 according to the aforementioned method may be greater than a time threshold. In this way, a situation that the content of the entire specific conference cannot be better characterized due to that the designated time sections identified by the processor 304 are too close is avoided, but the disclosure is not limited thereto.

In some embodiments, the processor 304 may also extend the designated time sections of the previous embodiments forward/backward by a period of time, and then use the extended designated time sections as the plurality of specific time sections in step S430, but the disclosure is not limited thereto.

Then, in step S440, the processor 304 obtains speech content of each discussant in each specific time section. Taking the aforementioned specific time section D1 as an example, after learning that the discussants therein include the participants A and C, the processor 304 may find out the speech content of the participants A and C in the specific time section D1 according to each time point in the specific time section D1, but the disclosure is not limited thereto.

In step S450, the processor 304 arranges a discussion image and the speech content of each discussant in each specific time section into a corresponding discussion video clip.

In an embodiment, the processor 304 performs roughly the same mechanism for generating corresponding discussion video clips for each specific time section. Therefore, an $i^{th}$ (i is an index value and is a positive integer) specific time section in the above specific time sections is temporarily treated as an example for description, but the disclosure is not limited thereto.

In general, the processor 304 may find out one or a plurality of discussants belonging to the $i^{th}$ specific time section, in order to distinguish from the aforementioned discussants, the one or plurality of discussants of the $i^{th}$ specific time section are referred to as first discussants, and a first discussion image and first speech content of each first discussant in the $i^{th}$ specific time section are found. Thereafter, the processor 304 may arrange the first discussion image and the first speech content of each first discussant into a discussion video clip corresponding to the $i^{th}$ specific time section according to a designated image layout. In an embodiment, the aforementioned designated image layout may include a speech content frame and a first image frame corresponding to each first discussant, where each first image frame may present the first discussion image of each first discussant, the speech content frame may include the first speech content of each first discussant, and the first speech content of each first discussant may be sorted in the speech content frame according to a speech time of each first discussant. In order to make the above concepts easier to understand, FIG. 7 is provided below for further description.

Figure 7:
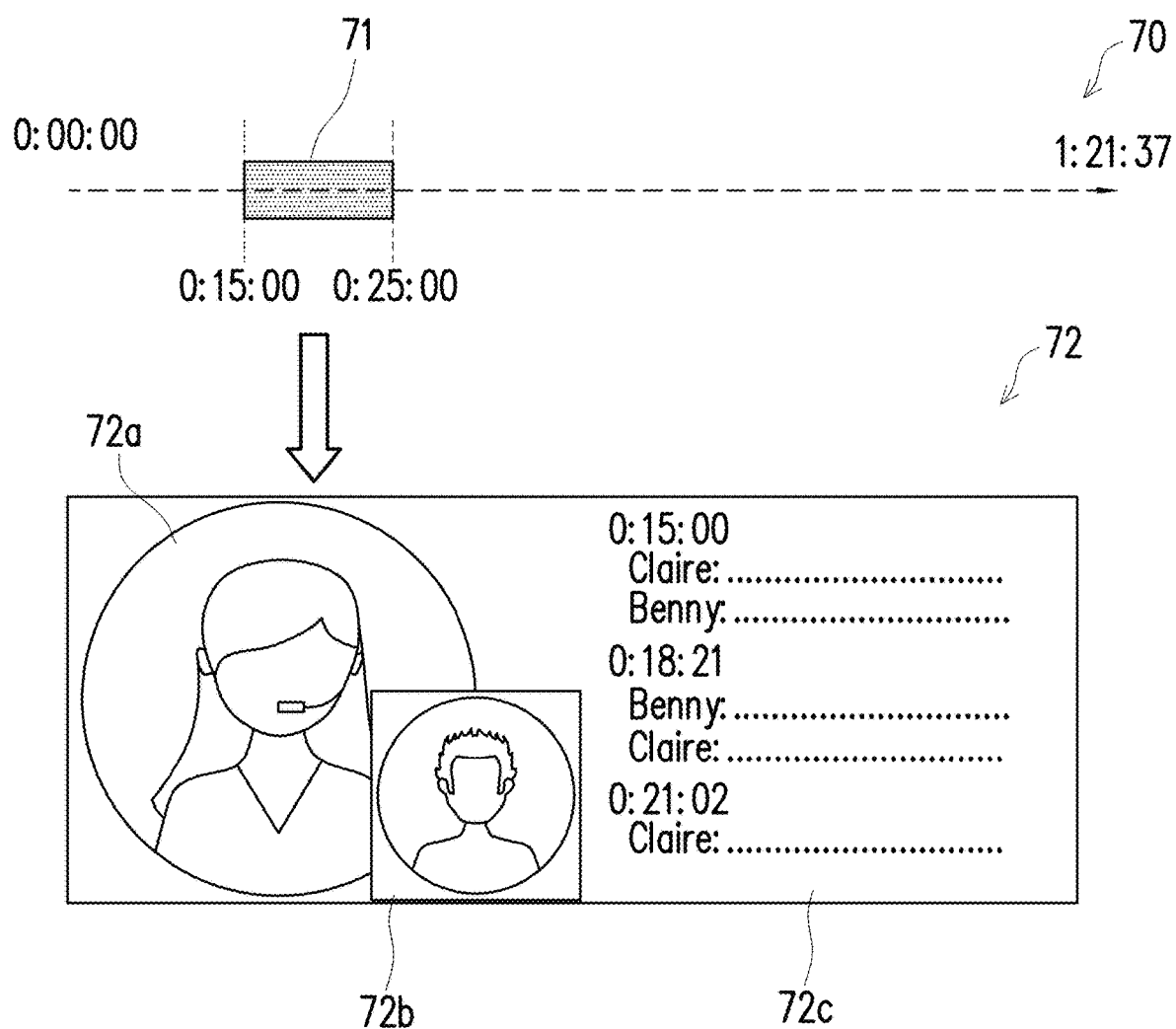
FIG. 7 is a schematic diagram of generating a discussion video clip according to an embodiment of the disclosure.

Referring to FIG. 7, FIG. 7 is a schematic diagram of generating a discussion video clip according to an embodiment of the disclosure. In FIG. 7, it is assumed that the processor 304 determines a specific time section 71 on a conference timeline 70 according to the teaching of the previous embodiments. In this case, the processor 304 may find out the discussants belonging to the specific time section 71. For ease of description, it is assumed below that the discussants in the specific time section 71 are Claire and Benny in FIG. 6, but the disclosure is not limited thereto.

Correspondingly, the processor 304 may find out the discussion images and speech content of Claire and Benny in the specific time section 71, and organize the discussion images and speech content of Claire and Benny in the specific time section 71 into discussion video clips corresponding to the specific time section 71 according to a designated image layout 72.

In FIG. 7, the designated image layout 72 may include a speech content frame 72c and image frames 72a and 72b corresponding to each discussant. In an embodiment, the designated image layout 72 may, for example, display the discussion image of the presenter (such as Claire) in the specific time section 71 in the larger image frame 72a, and display the discussion image of other discussants (such as Benny) in the smaller image frame 72b. In addition, the speech content frame 72c may include the speech content of Claire and Benny in the specific time section 71, and the speech content may be sorted in the speech content frame 72c according to a speech time of each of Claire and Benny.

In this case, when the discussion video clip corresponding to the specific time section 71 is played, the discussion images when Claire and Benny make related speeches in the specific time section 71 may be seen, but the disclosure is not limited thereto.

In different embodiments, the aforementioned designated image layout used by the processor 304 may also be adjusted to other layout forms according to the needs of the user, which is not limited to the picture-in-picture pattern shown in FIG. 7. In some embodiments, the processor 304 may determine the pattern of the designated image layout by itself, or the user may select a desired pattern as the designated image layout, but the disclosure is not limited thereto.

In some embodiments, since one or a plurality of first discussants in the $i^{th}$ specific time section may not have the corresponding first discussion image in a certain sub-time section of the $i^{th}$ specific time section for some reason, the processor 304 may correspondingly adjust the content of the first image frame of the first discussant in the sub-time section.

Taking FIG. 7 as an example, it is assumed that Benny does not have the corresponding discussion image in a certain sub-time section in the specific time section 71. In this case, the processor 304 may find out the image frame 72b corresponding to Benny, and display the image frame 72b as a predetermined image (for example, a portrait image) or a blank image in this sub-time section, or adjust this sub-time section to an image layout not including the image frame 72b (for example, an image layout that only includes the image frame 72a), but the disclosure is not limited thereto.

In some embodiments, regarding the $i^{th}$ specific time section, the user may further set an anchor point therein to sequentially divide the $i^{th}$ specific time section into a plurality of sub-time sections, and set a different image layout for each sub-time section.

Figure 8:
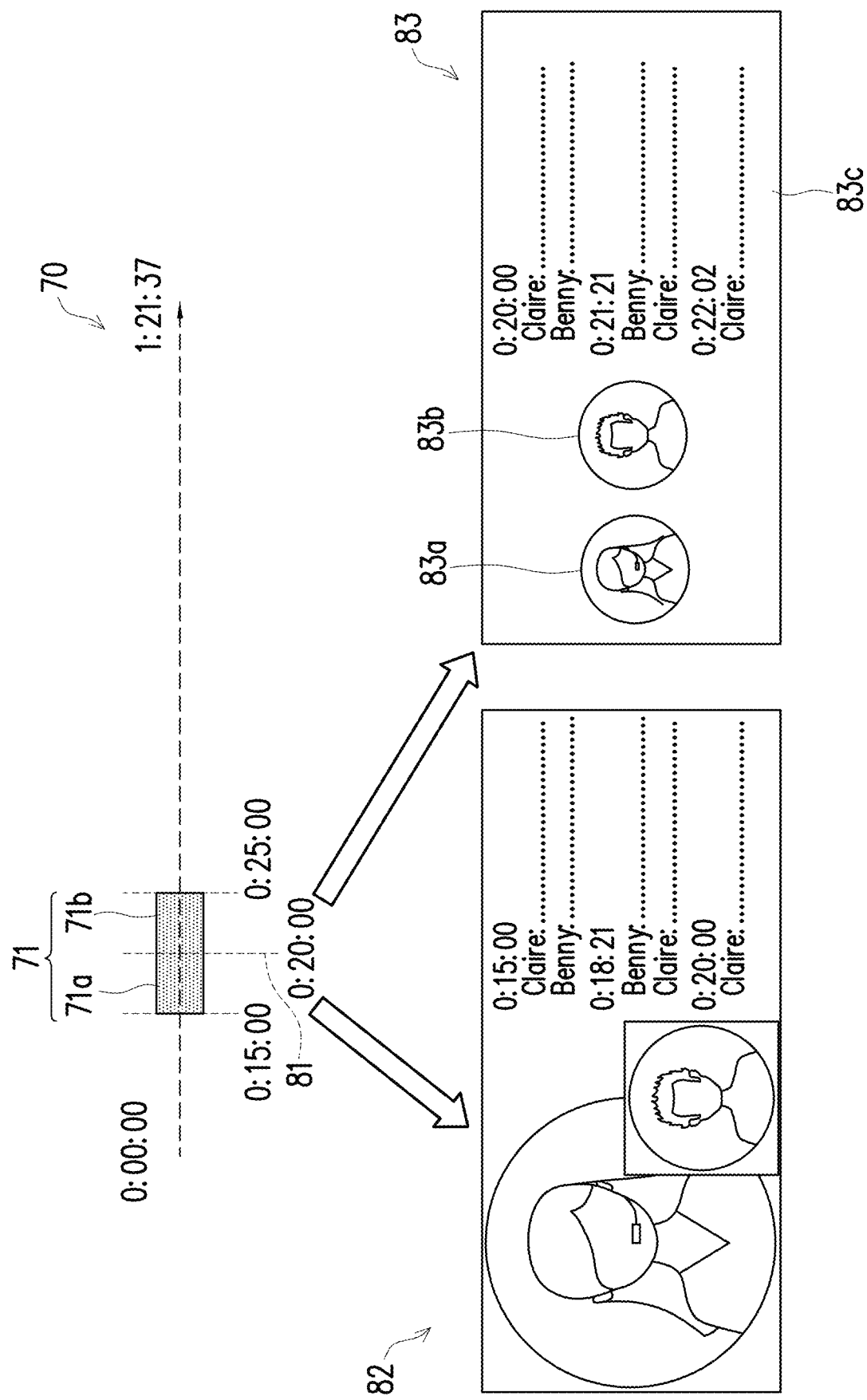
FIG. 8 is a schematic diagram of setting an anchor point according to FIG. 7.

Referring to FIG. 8, FIG. 8 is a schematic diagram of setting an anchor point according to FIG. 7. In FIG. 8, after determining the specific time section 71, it is assumed that the user additionally sets an anchor point 81 (a corresponding time point thereof is, for example, "0:20:00") in the specific time section 71, the processor 304 may divide the specific time section 71 into sub-time sections 71a and 71b accordingly.

In the embodiment, the processor 304 may, for example, arrange the discussion images and speech content of Claire and Benny in the sub-time section 71a into a first sub-discussion video clip corresponding to the sub-time section 71a according to a first image layout 82 (which may be the same as the designated image layout 72 in FIG. 7). In addition, the processor 304 may also arrange the discussion images and speech content of Claire and Benny in the sub-time section 71b into a second sub-discussion video clip corresponding to the sub-time section 71b according to a second image layout 83.

In FIG. 8, the second image layout 83 may include a speech content frame 83c and image frames 83a and 83b corresponding to each discussant. In an embodiment, the second image layout 83 may, for example, present the discussants (such as Benny and Claire) in the sub-time section 71b in the image frames 83a and 83b of the same size. In addition, the speech content frame 83c may include speech content of Claire and Benny in the sub-time section 71b, and the speech content may be sorted in the speech content frame 83c according to the speech time of each of Claire and Benny, but the disclosure is not limited thereto.

Thereafter, the processor 304 may sequentially splice the first sub-discussion video clip and the second sub-discussion video clip into a discussion video clip corresponding to the specific time section 71. In this case, when the discussion video clip corresponding to the specific time section 71 is played, the first sub-discussion video clip corresponding to the first image layout 82 and the second sub-discussion video clip corresponding to the second image layout 83 may be seen in sequence, but the disclosure is not limited thereto.

In some embodiments, after dividing the specific time section 71 into the sub-time sections 71a and 71b, the processor 304 may further insert a transition animation at an ending segment (for example, the last one to several seconds) of the sub-time section 71a sorted in the front, where the transition animation may be used to convert the first image layout 82 to the second image layout 83. In this case, when the discussion video clip corresponding to the specific time section 71 is played, the first sub-discussion video clip corresponding to the first image layout 82, the above transition animation, and the second sub-discussion video clip corresponding to the second image layout 83 may be seen in sequence, but the disclosure is not limited thereto.

In other embodiments, the user may set a required number of anchor points in the required specific time section according to an actual requirement, and the corresponding operations performed by the processor 304 may be learned by referring to the above teachings, and details thereof are not repeated.

After obtaining the discussion video clip corresponding to each specific time section, in step S460, the processor 304 may organize the discussion video clip corresponding to each specific time section into a conference recording video corresponding to the specific conference (which may be understood as a highlight clip of the aforementioned specific conference).

Figure 9:
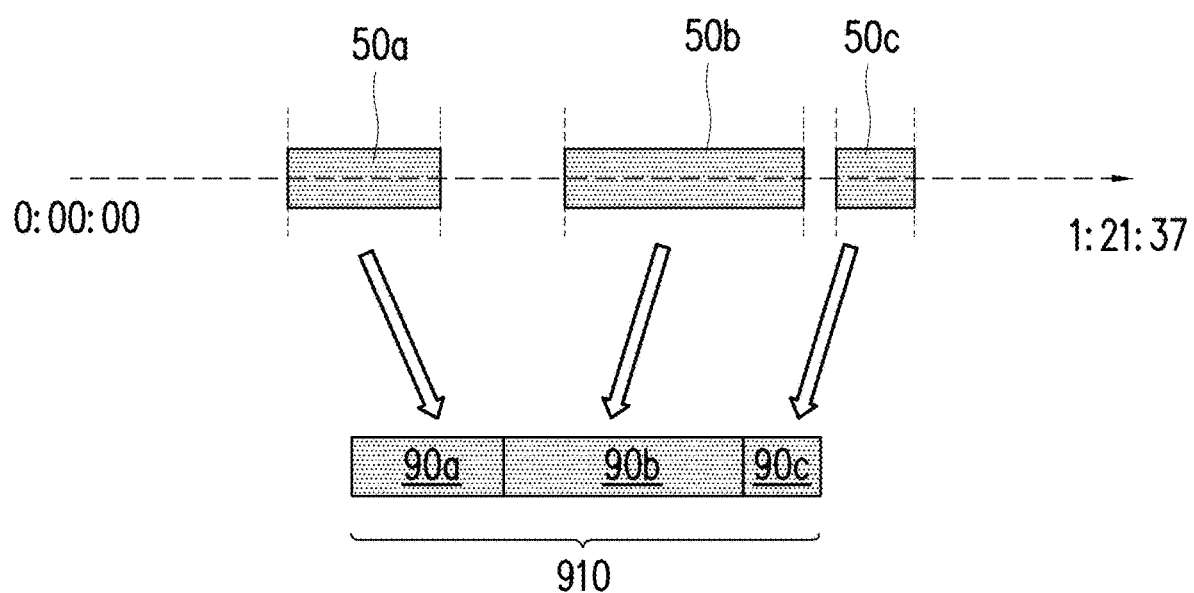
FIG. 9 is a schematic diagram of generating a conference recording video according to an embodiment of the disclosure.

Referring to FIG. 9, FIG. 9 is a schematic diagram of generating a conference recording video according to an embodiment of the disclosure. In the embodiment, it is assumed that the processor 304 has generated discussion video clips 90a-90c respectively corresponding to the specific time sections 50a-50c according to the above teachings after determining the specific time sections 50a-50c. In this case, the processor 304 may, for example, sequentially combine the discussion video clips 90a-90c into a conference recording video 910 corresponding to the aforementioned specific conference, but the disclosure is not limited thereto.

In some embodiments, the discussion video clip corresponding to each specific time section may also be set with different frame rates, so as to achieve a time-reducing/slow playback effect when playing the conference recording video.

Taking FIG. 9 as an example, it is assumed that the user wants the discussion video clips 90b and 90c to produce a time-reducing/fast playback effect when being played, the user may, for example, set the discussion video clip 90a to a first frame rate (for example, 30 frames per second), and set the discussion video clips 90b, 90c to a second frame rate (for example, 60 frames per second) higher than the first frame rate. Thereafter, the processor 304 may then sequentially combine the discussion video clips 90a-90c into the conference recording video 910 corresponding to the aforementioned specific conference. In this way, in the process of playing the conference recording video 910, when the parts of the discussion video clips 90b, 90c are played, the time-reducing/fast playback effect of the discussion video clips 90b, 90c is presented due to the change of the frame rate, but the disclosure is not limited thereto.

Further, compared to the conventional method of abandoning some frames to achieve the time-reducing/fast playback effect, the method of the disclosure may preserve all the images more completely.

On the other hand, it is assumed that the user wants the discussion video clips 90b and 90c to have a slow playback effect when being played, the user may, for example, set the discussion video clip 90a to a first frame rate (for example, 30 frames per second), and set the discussion video clips 90b and 90c to a second frame rate (for example, 15 frames per second) lower than the first frame rate. Thereafter, the processor 304 may then sequentially combine the discussion video clips 90a-90c into the conference recording video 910 corresponding to the aforementioned specific conference. In this way, in the process of playing the conference recording video 910, when the parts of the discussion video clips 90b, 90c are played, the slow playback effect of the discussion video clips 90b, 90c is presented due to the change of the frame rate, but the disclosure is not limited thereto.

In some embodiments, when adjusting the time-reducing/slow playback effect, the processor 304 may also adjust a sound part accordingly while maintaining a pitch, but the disclosure is not limited thereto.

In some embodiments, the processor 304 may also arrange the speech content of each participant into an editable verbatim script according to the aforementioned conference event data, where the editable verbatim script may sort the speech content of each participant according to the corresponding speech time. In some embodiments, the processor 304 may also provide a function of translating/summarizing the above editable verbatim script. In addition, the user may also select one or a plurality of paragraphs from the above editable verbatim script, and the processor 304 may find out the presenter (for example, the participant with the most speech content) from the one or plurality of paragraphs selected by the user. In addition, the user may manually edit the content of the aforementioned editable verbatim script by himself. In some embodiments, the user may also select one of the participants to follow, and the processor 304 may correspondingly find out a verbatim script of the related speech content of the participant for the user's reference/editing, but the disclosure is not limited thereto.

In some embodiments, the processor 304 may find one or a plurality of text fragments from the aforementioned editable verbatim script according to certain principles, and then combine the corresponding images to generate the corresponding conference recording video. For example, the processor 304 may score each text segment according to factors such as corresponding enthusiasm of interaction, a degree of intonation fluctuation, and an interval time between sentences, etc., where the score of each text segment may be positively correlated with the corresponding enthusiasm of interaction, the degree of intonation fluctuation, and is negatively related to the interval time between sentences, but the disclosure is not limited thereto.

In some embodiment, it is assumed that when the aforementioned specific conference is in progress, a related person has switched his speaking mode to a presenter mode at some time points (i.e., only the speaker is making a speech), the processor 304 may take out the time sections corresponding to the presenter mode to serve as the aforementioned specific time sections, but the disclosure is not limited thereto.

In some embodiments, it is assumed that when the aforementioned wide-view film further includes the region of interest (ROI) mentioned in Taiwan patent application No. 109145738 (the full text of which is incorporated herein by reference), the processor 304 may find out time points when an attribute of each ROI changes, and take out the time sections related to these time points to serve as the aforementioned specific time sections, but the disclosure is not limited thereto.

In view of the foregoing, in the disclosure, after obtaining the conference event data and the speech content of each participant related to the wide-view video of the specific conference, the user may manually determine multiple specific time sections in the wide-view video. Alternatively, the conference viewing device of the disclosure may automatically determine the aforementioned specific time sections according to certain principles. Next, in the method of the disclosure, the discussion image and speech content of each discussant are organized in each specific time section into corresponding discussion video clip, where the discussion video clip corresponding to each specific time section may adopt the corresponding image layout to present the discussion image and the speech content of each discussant. Then, in the method of the disclosure, the discussion video clips corresponding to each specific time section may be organized into the conference recording video corresponding to the specific conference. In this way, the method of the disclosure may intelligently condense the lengthy and difficult-to-view wide-view video into condensed highlight clips, and the efficiency of conference viewing is thereby improved.

It will be apparent to those skilled in the art that various modifications and variations can be made to the disclosed embodiments without departing from the scope or spirit of the disclosure. In view of the foregoing, it is intended that the disclosure covers modifications and variations provided they fall within the scope of the following claims and their equivalents.

What is claimed is:
1. A method for viewing a conference, comprising:
obtaining a wide-view video of a specific conference and a plurality of conference event data associated with the wide-view video, wherein each conference event data corresponds to a time point of the specific conference, and each conference event data records a sound source direction of a speaker at the corresponding time point and an image range of the speaker in the wide-view video;
obtaining individual speech content of a plurality of participants of the specific conference;

determining a plurality of specific time sections in the wide-view video, finding out at least one discussant in each of the specific time sections according to the plurality of conference event data corresponding to each of the specific time sections, wherein the step comprises:

providing a conference timeline of the wide-view video, and;

obtaining a designated number of persons, marking a plurality of first reference time sections on the conference timeline accordingly, wherein a number of the participants or a number of the at least one discussant corresponding to each of the first reference time sections is not less than the designated number of persons;

arranging a discussion image of each of the at least one discussant and the speech content of each of the at least one discussant in each of the specific time sections into a corresponding discussion video clip; and organizing the discussion video clip corresponding to each of the specific time sections into a conference recording video corresponding to the specific conference.

2. The method according to claim 1, wherein the step of determining the plurality of specific time sections in the wide-view video comprises:

in response to determining that the conference timeline is marked with a plurality of designated time sections by a user, treating the designated time sections as the specific time sections.

3. The method according to claim 2, further comprising:
providing a discussion-participating timeline of each participant in the specific conference, wherein the discussion-participating timeline of each participant is marked with at least one discussion-participating section of each participant in the specific conference.

4. The method according to claim 1, wherein the step of determining the plurality of specific time sections in the wide-view video comprises:

providing the participants of the specific conference for selection;

in response to determining that a first participant among the participants is selected by the user, marking at least one discussion-participating section of the first participant in the specific conference on the conference timeline of the wide-view video; and treating the at least one discussion-participating section of the first participant as the specific time sections.

5. The method according to claim 4, further comprising:
finding out the at least one discussant in the at least one discussion-participating section of the first participant based on the conference event data, and presenting each of the at least one discussant corresponding to each of the discussion-participating sections by a discussant list corresponding to each of the discussion-participating sections.

6. The method according to claim 1, wherein the step of determining the plurality of specific time sections in the wide-view video comprises:

in response to determining that the first reference time sections have a plurality of designated time sections selected by the user, treating the designated time sections as the specific time sections.

7. The method according to claim 1, wherein the step of determining the plurality of specific time sections in the wide-view video comprises:

obtaining a search keyword, marking a plurality of second reference time sections on the conference timeline accordingly, wherein the speech content of the participants in each of the second reference time sections comprises the search keyword; and in response to determining that the second reference time sections have a plurality of designated time sections selected by the user, treating the designated time sections as the specific time sections.

8. The method according to claim 1, wherein the specific time sections comprise an ith specific time section, i is a positive integer, and the step of arranging the discussion image and the speech content of each of the at least one discussant in each of the specific time sections into the corresponding discussion video clip comprises:

finding out at least one first discussant belonging to the ith specific time section, finding out a first discussion image and first speech content of each of the at least one first discussant in the ith specific time section; and arranging the first discussion image and the first speech content of each of the at least one first discussant into the discussion video clip corresponding to the ith specific time section according to a designated image layout, wherein the designated image layout comprises a speech content frame and at least one first image frame corresponding to the at least one first discussant, wherein each of the at least one first image frame presents the first discussion image of each of the at least one first discussant, and the speech content frame comprises the first speech content of each of the at least one first discussant, and the first speech content of each of the at least one first discussant is sorted in the speech content frame according to a speech time of each of the at least one first discussant.

9. The method according to claim 8, wherein in response to determining that a second discussant in the at least one first discussant does not have the corresponding first discussion image in a sub-time section in the ith specific time section, the method further comprises:

finding out a third image frame corresponding to the second discussant from at least one second image frame; and displaying the third image frame as a predetermined image or a blank image in the sub-time section or adjusting the sub-time section to another image layout not comprising the third image frame.

10. The method according to claim 1, wherein the specific time sections comprise an ith specific time section, i is a positive integer, and the method further comprises:

finding out at least one third discussant belonging to the ith specific time section, finding out a first discussion image and first speech content of each of the at least one third discussant in the ith specific time section;

in response to determining that an anchor point is inserted in the ith specific time section, sequentially dividing the ith specific time section into a first sub-time section and a second sub-time section according to the anchor point;

arranging the first discussion image and the first speech content of each of the at least one third discussant in the first sub-time section into a first sub-discussion video clip corresponding to the first sub-time section according to a first image layout;

arranging the first discussion image and the first speech content of each of the at least one third discussant in the second sub-time section into a section sub-discussion video clip corresponding to the second sub-time section according to a second image layout; and sequentially splicing the first sub-discussion video clip and the second sub-discussion video clip into the discussion video clip corresponding to the ith specific time section.

11. The method according to claim 10, further comprising:

inserting a transition animation at an ending segment of the first sub-discussion video clip, wherein the transition animation is used to convert the first image layout to the second image layout.

12. The method according to claim 1, further comprising:

arranging the speech content of each of the participants into an editable verbatim script according to the conference event data.

13. The method according to claim 1, wherein the specific time sections comprise an ith specific time section and an (i+1)th specific time section, i is a positive integer, and the step of organizing the discussion video clip corresponding to each of the specific time sections into the conference recording video corresponding to the specific conference comprises:

setting the discussion video clip corresponding to the ith specific time section to a first frame rate, and setting the discussion video clip corresponding to the (i+1)th specific time section to a second frame rate, wherein the first frame rate is different from the second frame rate.

14. The method according to claim 1, wherein the step of determining the plurality of specific time sections in the wide-view video comprises:

identifying a specific participant of the specific conference from the participants, providing a discussion-participating timeline of the specific participant in the specific conference, wherein the discussion-participating timeline of the specific participant is marked with at least one discussion-participating section of the specific participation in the specific conference; and finding out a plurality of designated time sections from the at least one discussion-participating section of the specific participant, treating the designated time sections as the specific time sections, wherein a time difference between each of the designated time sections is greater than a time threshold.

15. The method according to claim 1, wherein the step of determining the plurality of specific time sections in the wide-view video comprises:

treating the first reference time sections as the specific time sections.

16. The method according to claim 1, wherein a viewing angle of the wide-view video is greater than or equal to 180 degrees.

17. The method according to claim 1, further comprising:

marking a plurality of persons of interest and/or objects of interest in the wide-view video, wherein the plurality of persons of interest and/or objects of interest at least partially correspond to the plurality of participants;

selectively labeling at least a part of the plurality of persons of interest and/or objects of interest with a plurality of tags; and selectively enabling a user to select the at least a part of the plurality of persons of interest and/or objects of interest corresponding to the plurality of participants.

18. A conference viewing device, comprising:

a storage circuit, storing a program code; and a processor, coupled to the storage circuit, accessing the program code to obtain a wide-view video of a specific conference and a plurality of conference event data associated with the wide-view video, wherein each conference event data corresponds to a time point of the specific conference, and each conference event data records a sound source direction of a speaker at the corresponding time point and an image range of the speaker in the wide-view video;

obtain individual speech content of a plurality of participants of the specific conference;

determine a plurality of specific time sections in the wide-view video, find out at least one discussant in each of the specific time sections according to the plurality of conference event data corresponding to each of the specific time sections, wherein the step comprises:

providing a conference timeline of the wide-view video, and;

obtaining a designated number of persons, marking a plurality of first reference time sections on the conference timeline accordingly, wherein a number of the participants or a number of the at least one discussant corresponding to each of the first reference time sections is not less than the designated number of persons;

arrange a discussion image of each of the at least one discussant and the speech content of each of the at least one discussant in each specific time section into a corresponding discussion video clip; and organize the discussion video clip corresponding to each of the specific time sections into a conference recording video corresponding to the specific conference.

* * * * *